United States Patent
Anderson

(10) Patent No.: US 10,416,992 B2
(45) Date of Patent: Sep. 17, 2019

(54) TECHNIQUES FOR WEB APPLICATION UPDATES

(71) Applicant: WhatsApp Inc., Menlo Park, CA (US)

(72) Inventor: Matthew Ryan Anderson, San Jose, CA (US)

(73) Assignee: WHATSAPP INC., Menlo Park, CA (US)

( * ) Notice: Subject to any disclaimer, the term of this patent is extended or adjusted under 35 U.S.C. 154(b) by 52 days.

(21) Appl. No.: 15/717,262

(22) Filed: Sep. 27, 2017

(65) Prior Publication Data

US 2019/0095196 A1    Mar. 28, 2019

(51) Int. Cl.
G06F 9/44 (2018.01)
G06F 8/658 (2018.01)
G06F 8/71 (2018.01)

(52) U.S. Cl.
CPC .............. G06F 8/658 (2018.02); G06F 8/71 (2013.01)

(58) Field of Classification Search
CPC .................................. G06F 8/658; G06F 8/71
USPC .................................................. 717/168–178
See application file for complete search history.

(56) References Cited

U.S. PATENT DOCUMENTS

| | | | | |
|---|---|---|---|---|
| 2009/0259744 A1* | 10/2009 | Kolke | ....................... | G06F 9/52 709/224 |
| 2010/0242032 A1* | 9/2010 | Ladki | ....................... | G06F 8/71 717/171 |
| 2012/0207159 A1* | 8/2012 | Buchko | ................... | H04L 45/16 370/390 |
| 2013/0198338 A1* | 8/2013 | Pinto | ................... | H04L 67/2842 709/219 |
| 2013/0247030 A1* | 9/2013 | Kay | ........................ | H04L 67/34 717/178 |
| 2014/0173587 A1* | 6/2014 | Balachandran | ........... | G06F 8/60 717/173 |
| 2014/0282468 A1* | 9/2014 | Millett | ...................... | G06F 8/65 717/170 |
| 2015/0355899 A1* | 12/2015 | Agarwal | ................. | G06F 8/658 717/170 |

(Continued)

OTHER PUBLICATIONS

Title: An HTTP-Based Versioning Mechanism for Linked Data, author: Herbert Van de Sompel et al, dated Mar. 18, 2010.*

(Continued)

Primary Examiner — Chameli Das

(57) ABSTRACT

Techniques to update a web application are described. A method includes receiving an application update request for a requested web application from a service worker web application executing in a web browser on a client device, the application update request comprising a cached version indicator for a local cached copy of the requested web application on the client device; determining whether an updated requested web application is available based on the cached version indicator. When the cached version indicator is less than a current version indicator, an archived copy of the previous version of the requested web application indicated by the cached version indicator and a current copy of the current version of the requested web application are retrieved, and a delta update is generated based on the archived copy and current copy. The delta update is sent to the service worker web application. Other embodiments are described and claimed.

17 Claims, 13 Drawing Sheets

(56) References Cited

U.S. PATENT DOCUMENTS

| | | | |
|---|---|---|---|
| 2016/0080345 A1* | 3/2016 | Safruti | H04L 67/02 |
| | | | 726/6 |
| 2016/0198016 A1* | 7/2016 | Tiger | H04L 47/823 |
| | | | 709/213 |
| 2017/0048339 A1* | 2/2017 | Straub | G06F 16/2379 |
| 2017/0153883 A1* | 6/2017 | Oliver | G06F 8/65 |

OTHER PUBLICATIONS

Title: Safe Software updates via multi version execution; author: Petr Hosek et al, source: ACM dated May 2013.*

* cited by examiner

*800*

RECEIVE AN APPLICATION UPDATE REQUEST FOR A REQUESTED WEB APPLICATION, THE REQUEST COMPRISING A CACHED VERSION INDICATOR FOR A CACHED COPY OF THE REQUESTED WEB APPLICATION
802

DETERMINE WHETHER AN UPDATED REQUESTED WEB APPLICATION IS AVAILABLE BASED ON THE CACHED VERSION INDICATOR RECEIVED FROM THE SERVICE WORKER WEB APPLICATION
804

RETRIEVE AN ARCHIVED COPY OF THE PREVIOUS VERSION OF THE REQUESTED WEB APPLICATION INDICATED BY THE CACHED VERSION INDICATOR
806

RETRIEVE A CURRENT COPY OF THE CURRENT VERSION OF THE REQUESTED WEB APPLICATION
808

GENERATE A DELTA UPDATE BASED ON THE ARCHIVED COPY AND CURRENT COPY
810

SEND THE DELTA UPDATE TO THE SERVICE WORKER WEB APPLICATION
812

TECHNIQUES FOR WEB APPLICATION UPDATES

BACKGROUND

Users of mobile devices, such as smartphones, may use their mobile devices to execute applications. These applications may perform communications and network tasks on behalf of their user. A web application may include a client-side application executing within a web browser application on a client device that communicates with an application server. The web application may need to be updated to correct bugs, add features, or improve functionality. The updates may need to be communicated over a network to the client device.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques for web application updates. Some embodiments are particularly directed to techniques for web application updates using web application service workers. In one embodiment, for example, an apparatus may comprise a web application server component operative to receive an application update request for a requested web application from a service worker web application, the service worker web application executing in a web browser on a client device, the application update request comprising a cached version indicator for a cached copy of the requested web application local to the client device; and send a delta update to the service worker web application where the cached version indicator is less than a current version indicator of the requested web application on the web application server. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 8 illustrates an embodiment of a logic flow for the system of FIG. 1.

DETAILED DESCRIPTION

Figure 1:
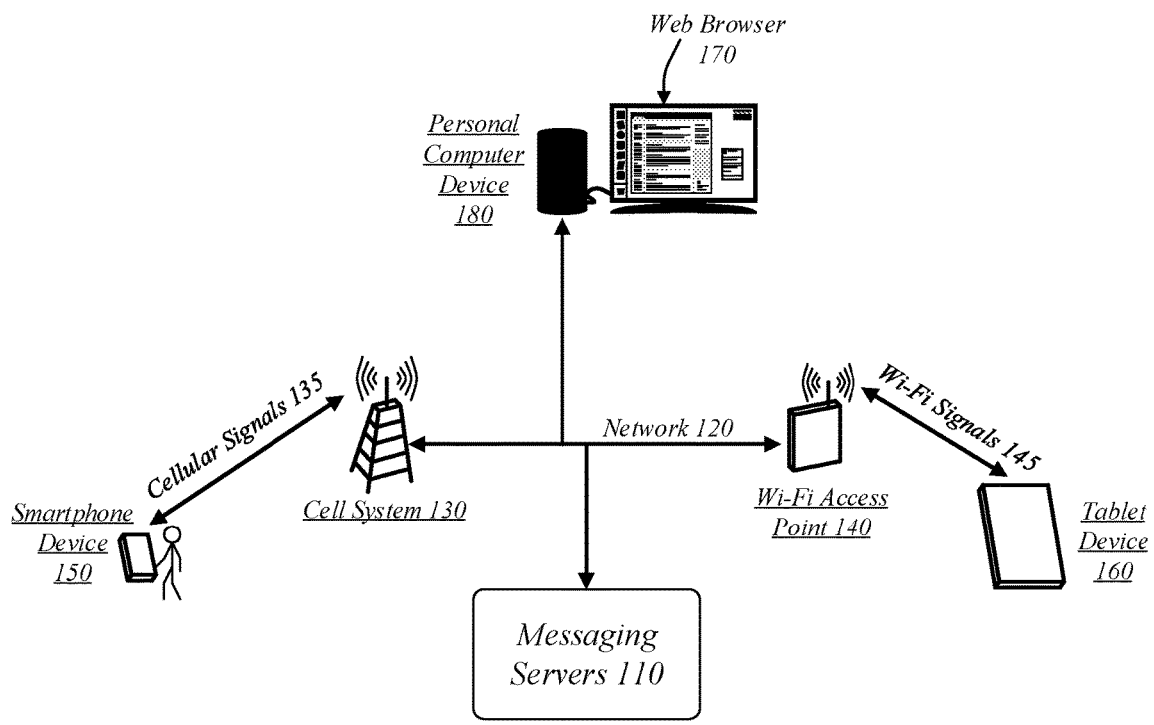
FIG. 1 illustrates an embodiment of a web application update system.

A web browser may be used to execute a web application. Such a web application may comprise a messaging application used as an access point to a messaging system. Such a web application may, in some embodiments, use a messaging client on a mobile client device as a component of its access to the messaging system.

A messaging application may empower a user to message with other users as part of a messaging service. In some implementations, the messaging applications on mobile devices may be used as the authority for a user's access to a messaging service, as the single point of truth for a user with the messaging service, and as a repository for much of the information for the user's use of the messaging service. The mobile messaging application may therefore comprise a user's primary endpoint for interacting with the messaging service.

Users of the messaging service may sometimes wish to use a personal computer, such as a desktop computer or laptop computer, to access the messaging service. However, as the messaging application serves as the controlling endpoint for a user's interaction with the messaging service, the personal computer may not simply connect to the servers of the messaging service to use the messaging service in the same manner as the mobile device does. Instead, a web browser on the personal computer may be used to access the messaging application on the mobile device, so as to provide access on the personal computer to the messaging service while maintaining the messaging application's role as the controlling endpoint. As a result, access to the messaging service may be extended to personal computers while maintaining the primacy of mobile devices with the messaging service.

The web application may comprise a client-side executable that executes within the web browser. The client-side executable may comprise an application written in a cross-platform, object-oriented scripting language used to make web pages active, for example, a JavaScript® application. To support efficient updating, the web application may be loaded and maintained by an intermediary service worker, itself a web application. The intermediary service worker intercepts network requests for the web application and is operative to download and cache the web application, retrieve a cached web application, download updates to a cached web application, and to generally efficiently manage the use of the web application.

The intermediary service worker may be used to manage updates to the web application. Conventionally, a web application may use a plurality of files to provide its functionality. Conventional updates to web applications may be performed by replacing one or more of those files in their entirety, usually transferred to the client device via a network file download. Generally, however, an updated file may only differ from the previous version of the file by some small amount, e.g. by 5%. Consequently, conventional web application updates use more network and processing bandwidth than the techniques described herein below, and may suffer when the network is unreliable.

By using a cached web application and delta updates to the web application, rather than complete downloads, devices with slow network access or metered network access may receive an improved experience.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-*a* may include components 122-1, 122-2, 122-3, 122-4 and 122-5. The embodiments are not limited in this context.

FIG. 1 illustrates a block diagram for a web application update system 100. In one embodiment, the web application update system 100 may comprise a computer-implemented system having software applications comprising one or more components. Although the web application update system 100 shown in FIG. 1 has a limited number of elements in a certain topology, it may be appreciated that the web application update system 100 may include more or less elements in alternate topologies as desired for a given implementation.

Messaging servers 110 may comprise one or more messaging servers operated by a messaging platform as part of a messaging system. A messaging server may comprise an Internet-accessible server, with the network 120 connecting the various devices of the messaging system comprising, at least in part, the Internet. A messaging system may use the messaging servers 110 to support messaging for various user client devices.

A user may own and operate a smartphone device 150. The smartphone device 150 may comprise an iPhone® device, an Android® device, a Blackberry® device, or any other mobile computing device conforming to a smartphone form. The smartphone device 150 may be a cellular device capable of connecting to a network 120 via a cell system 130 using cellular signals 135. In some embodiments and in some cases the smartphone device 150 may additionally or alternatively use Wi-Fi or other networking technologies to connect to the network 120. The smartphone device 150 may execute a messaging client, web browser, or other local application to access the messaging servers 110.

The same user may own and operate a tablet device 160. The tablet device 150 may comprise an iPad® device, an Android® tablet device, a Kindle Fire® device, or any other mobile computing device conforming to a tablet form. The tablet device 160 may be a Wi-Fi device capable of connecting to a network 120 via a Wi-Fi access point 140 using Wi-Fi signals 145. In some embodiments and in some cases the tablet device 160 may additionally or alternatively use cellular or other networking technologies to connect to the network 120. The tablet device 160 may execute a messaging client, web browser, or other local application to access the messaging servers 110.

The same user may own and operate a personal computer device 180. The personal computer device 180 may comprise a Mac OS® device, Windows® device, Linux® device, or any other computer device running another operating system. The personal computer device 180 may be an Ethernet device capable of connecting to a network 120 via an Ethernet connection. In some embodiments and in some cases the personal computer device 180 may additionally or alternatively use cellular, Wi-Fi, or other networking technologies to the network 120. The personal computer device 180 may execute a messaging client, web browser 170, or other local application to access the messaging servers 110.

A messaging client may be a dedicated messaging client. A dedicated messaging client may be specifically associated with a messaging provider administering the messaging platform including the messaging servers 110. A dedicated messaging client may be a general client operative to work with a plurality of different messaging providers including the messaging provider administering the messaging platform including the messaging servers 110.

The messaging client may be a component of an application providing additional functionality. For example, a social networking service may provide a social networking application for use on a mobile device for accessing and using the social networking service. The social networking service may include messaging functionality such as may be provided by messaging servers 110. It will be appreciated that the messaging servers 110 may be one component of a computing device for the social networking service, with the computing device providing additional functionality of the social networking service. Similarly, the social networking application may provide both messaging functionality and additional social networking functionality.

In some cases, a messaging endpoint may retain state between user sessions and in some cases a messaging endpoint may relinquish state between user session. A messaging endpoint may use a local store to retain the current state of a message inbox. This local store may be saved in persistent storage such that the state may be retrieved between one session and the next, including situations in which, for example, a local application is quit or otherwise removed from memory or a device is powered off and on again. Alternatively, a messaging endpoint may use a memory cache to retain the current state of a message inbox but refrain from committing the state of the message inbox to persistent storage.

A messaging endpoint that retains the state of a message inbox may comprise a dedicated messaging application or a messaging utility integrated into another local application, such as a social networking application. A messaging endpoint that relinquishes state of a message inbox may comprise messaging access implemented within a web browser. In one embodiment, a web browser, such as web browser 170 executing on personal computer device 180, may execute HTML5 code that interacts with the messaging server to present messaging functionality to a user.

A user may send and receive messages from a plurality of devices, including the smartphone device 150, tablet device 160, and personal computer device 180. The user may use a first messaging application on the smartphone device 150, a second messaging application on the tablet device 160, and the web browser 170 on the personal computer device 180.

The first and second messaging applications may comprise installations of the same application on both devices. The first and second messaging applications may comprise a smartphone-specific and a tablet-specific version of a common application. The first and second messaging application may comprise distinct applications.

The user may benefit from having their message inbox kept consistent between their devices. A user may use their smartphone device 150 on the cell system 130 while away from their home, sending and receiving messages via the cells system 130. The user may stop by a coffee shop, or other location offering Wi-Fi, and connect their tablet device 160 to a Wi-Fi access point 140. The tablet device 160 may retrieve its existing known state for the message inbox and receive updates that have happened since the last occasion on which the tablet device 160 had access to a network, including any messages sent by the smartphone device 150 and that may have been received by the user while operating the smartphone device 150. The user may then return home and access their message inbox using a web browser 170 on a personal computer device 180. The web browser 170 may receive a snapshot of the current state of the message inbox from the messaging servers 110 due to it not maintaining or otherwise not having access to an existing state for the message inbox. The web browser 170 may then retrieve incremental updates for any new changes to the state of the message inbox so long as it maintains a user session with the messaging servers 110, discarding its known state for the message inbox at the end of the session, such as when the web browser 170 is closed by the user. Without limitation, an update may correspond to the addition of a message to a mailbox, a deletion of a message from a mailbox, and a read receipt.

A messaging system may operate by defining a messaging inbox as comprising a plurality of messages, wherein each message is an individual transaction of communication between two or more participants. A mail server may operate by maintaining a message index for the messaging inbox. Mail servers may receive messages and store the messages in mail archives from which messages may be retrieved through reference to the message index. Mail clients may connect to the mail servers and retrieve messages that have been added to their mail archive since their last update. The mail clients may receive a mail index from the mail archive indicating what messages are stored in the mail archive. The mail clients may compare the mail archive to their current inbox in order to determine what messages they are missing, which they then request from the mail archive. The mail clients may make changes to their inbox, which results in mail inbox instructions being transmitted to the mail archives instructing the mail archives in modifications to make to the representation of their mail inbox on the mail archives.

Messaging interactions mediated by a messaging system may be organized into shared spaces known as message threads. A message thread may collect together the messages shared between a particular group of users. Messages sent individually between a pair of users may be collected into a one-on-one message thread uniquely associated with the private messaging between the pair of users. Messages sent between a group of three or more users may not be uniquely defined by their membership, but instead by, in some embodiments, an identifier uniquely identifying the group thread. Membership in a group thread may, in some embodiments, vary over time, adding and/or losing members.

Messaging interactions may use end-to-end encrypted communication between client devices. A sending client device may encrypt an outgoing message using security techniques that establish one of only the receiving device being able to decrypt the outgoing message (e.g., by using public-key cryptography) or only the sending and receiving devices being able to decrypt the outgoing message (e.g., by using shared-key cryptography). In these embodiments, the servers of the messaging system may be prevented from decrypting messages being sent between clients. In some embodiments, users can select whether a particular message thread uses end-to-end encryption (and thereby receive the additional privacy of the messaging servers being prevented from accessing the contents of messages) or doesn't (and thereby receive the benefit of the messaging system being able to programmatically access messages for the purpose of offering relevant services to the users).

The messaging system may use knowledge generated from interactions between users. The messaging system may comprise a component of a social-networking system and may use knowledge generated from the broader interactions of the social-networking system. As such, to protect the privacy of the users of the messaging system and the larger social-networking system, messaging system may include an authorization server (or other suitable component(s)) that allows users to opt in to or opt out of having their actions logged by the messaging system or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of the messaging system and other elements of a social-networking system through blocking, data hashing, anonymization, or other suitable techniques as appropriate.

Figure 2:
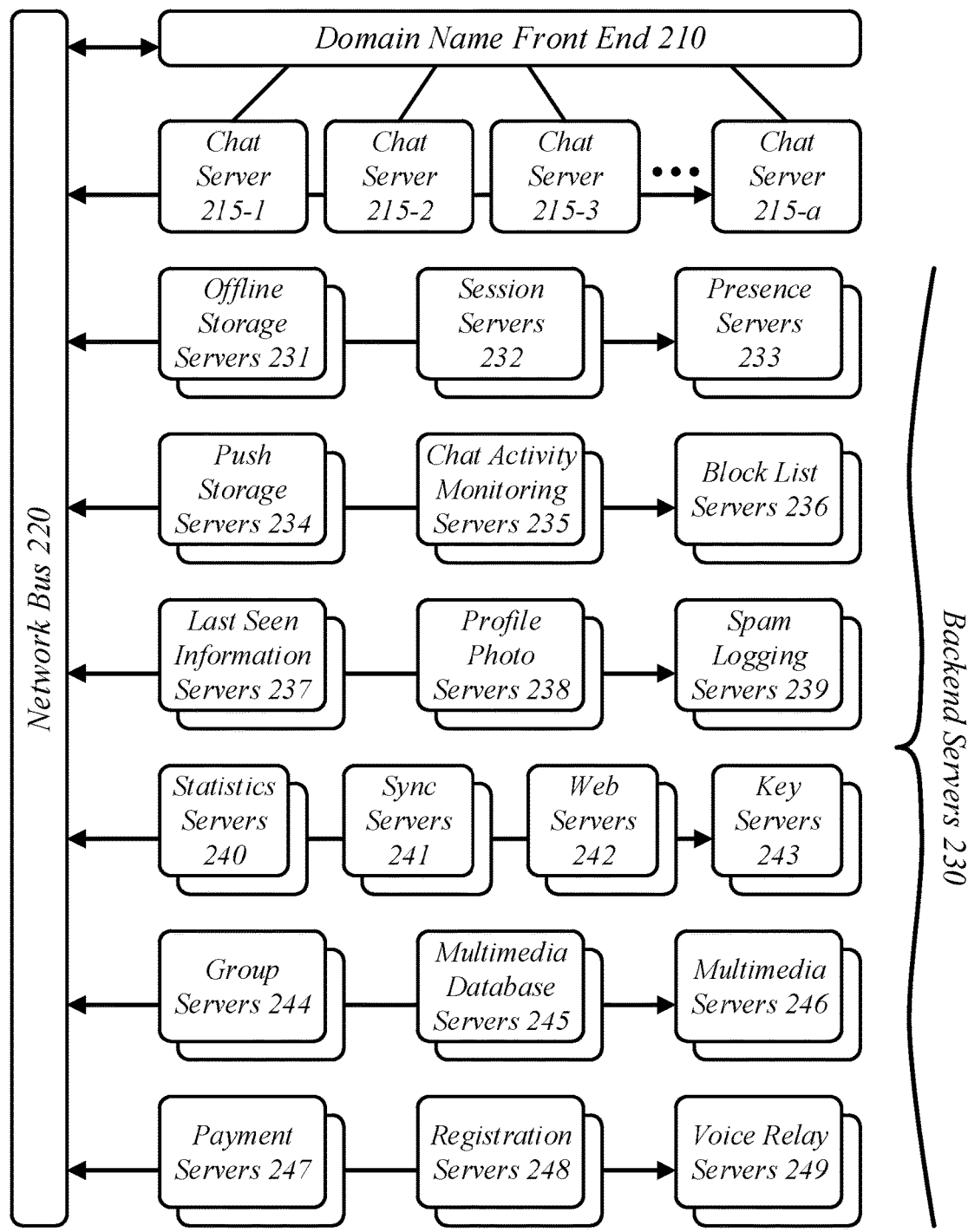
FIG. 2 illustrates an embodiment of a messaging system.

FIG. 2 illustrates an embodiment of a plurality of servers implementing various functions of a messaging system 200. It will be appreciated that different distributions of work and functions may be used in various embodiments of a messaging system 200. The messaging system 200 may comprise the web application update system 100 with the operations of the web application update system 100 comprising a portion of the overall operations of the messaging system 200. The illustrated embodiment of the messaging system 200 may particularly correspond to a portion of the messaging servers 110 described with reference to FIG. 1 comprising one or more server devices providing messaging services to the user of the messaging system 200.

The various servers of the messaging system 200 are connected via a network bus 220. The network bus 220 provides network connectivity between the domain name front end 210, the servers of the messaging system 220, and various external devices, such as client devices. Each of the servers is independently connected to the network bus 220 such that they may independently communicate with each other and/or user devices via the network bus 220.

The messaging system 200 may comprise a domain name front end 210. The domain name front end 210 may be assigned one or more domain names associated with the messaging system 200 in a domain name system (DNS). The domain name front end 210 may receive incoming connections and distribute the connections to servers providing various messaging services.

The messaging system 200 may comprise one or more chat servers 215. The chat servers 215 may comprise front-end servers for receiving and transmitting user-to-user messaging updates such as chat messages. Incoming connections may be assigned to the chat servers 215 by the domain name front end 210 based on workload balancing.

The messaging system 200 may comprise backend servers 230. The backend servers 230 may perform specialized tasks in the support of the chat operations of the front-end chat servers 215. A plurality of different types of backend servers 230 may be used. It will be appreciated that the assignment of types of tasks to different backend serves 230 may vary in different embodiments. In some embodiments, some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging system 200 may comprise one or more offline storage servers 231. The one or more offline storage servers 231 may store messaging content for currently-offline messaging endpoints in hold for when the messaging endpoints reconnect.

The messaging system 200 may comprise one or more session servers 232. The one or more session servers 232 may maintain session state of connected messaging endpoints.

The messaging system 200 may comprise one or more presence servers 233. The one or more presence servers 233 may maintain presence information for the messaging system 200. Presence information may correspond to user-specific information indicating whether or not a given user has an online messaging endpoint and is available for chatting, has an online messaging endpoint but is currently away from it, does not have an online messaging endpoint, and any other presence state.

The messaging system 200 may comprise one or more push storage servers 234. The one or more push storage servers 234 may cache push requests and transmit the push requests to messaging endpoints. Push requests may be used to wake messaging endpoints, to notify messaging endpoints that a messaging update is available, and to otherwise perform server-side-driven interactions with messaging endpoints.

The messaging system 200 may comprise one or more chat activity monitoring servers 235. The one or more chat activity monitoring servers 235 may monitor the chats of users to determine unauthorized or discouraged behavior by the users of the messaging system 200. The one or more chat activity monitoring servers 235 may work in cooperation with the spam logging servers 239 and block list servers 236, with the one or more chat activity monitoring servers 235 identifying spam or other discouraged behavior and providing spam information to the spam logging servers 239 and blocking information, where appropriate to the block list servers 236.

The messaging system 200 may comprise one or more block list servers 236. The one or more block list servers 236 may maintain user-specific block lists, the user-specific incoming-block lists indicating for each user the one or more other users that are forbidden from transmitting messages to that user. Alternatively, or additionally, the one or more block list servers 236 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging system 200 may comprise one or more last seen information servers 237. The one or more last seen information servers 237 may receive, store, and maintain information indicating the last seen location, status, messaging endpoint, and other elements of a user's last seen connection to the messaging system 200.

The messaging system 200 may comprise one or more profile photo servers 238. The one or more profile photo servers 238 may store and make available for retrieval profile photos for the plurality of users of the messaging system 200.

The messaging system 200 may comprise one or more spam logging servers 239. The one or more spam logging servers 239 may log known and suspected spam (e.g., unwanted messages, particularly those of a promotional nature). The one or more spam logging servers 239 may be operative to analyze messages to determine whether they are spam and to perform punitive measures, in some embodiments, against suspected spammers (users that send spam messages).

The messaging system 200 may comprise one or more statistics servers 240. The one or more statistics servers may compile and store statistics information related to the operation of the messaging system 200 and the behavior of the users of the messaging system 200.

The messaging system 200 may comprise one or more sync servers 241. The one or more sync servers 241 may sync the messaging system 240 with contact information from a messaging endpoint, such as an address book on a mobile phone, to determine contacts for a user in the messaging system 200.

The messaging system 200 may comprise one or more web servers 242. The one or more web servers 242 may engage in hypertext transport protocol (HTTP) and hypertext transport protocol secure (HTTPS) connections with web browsers. The one or more web servers 242 may, in some embodiments, host the remote web server 350 as part of the operation of the web application update system 100.

The messaging system 200 may comprise one or more key servers 243. The one or more key servers 243 may host public keys for public/private key encrypted communication.

The messaging system 200 may comprise one or more group servers 244. The one or more group servers 244 may maintain lists of groups, add users to groups, remove users from groups, and perform the reception, caching, and forwarding of group chat messages.

The messaging system 200 may comprise one or more multimedia database (MMD) servers 245. The MMD servers 245 may store a database, which may be a distributed database, of media objects known to the messaging system 200. In some embodiments, only media objects currently stored or otherwise in-transit within the messaging system 200 may be tracked by the MMD servers 245. In other embodiments, the MMD servers 245 may maintain a record of media objects that are no longer in-transit, such as may be for tracking popularity or other data-gathering purposes.

The MMD servers 245 may determine the storage location of media objects when they are to be stored by the messaging system 200, such as on multimedia servers 246. The MMD servers 245 may determine the existing storage location of media objects when they are to be transmitted by the messaging system 200, such as which of a plurality of multimedia servers 236 store a particular media object. The MMD servers 245 may generate the uniform resource locators (URLs) for use by messaging clients to request and retrieve media objects. The MMD servers 245 may track when a media object has been corrupted or otherwise lost and should be reacquired.

The messaging system 200 may comprise one or more multimedia servers 246. The one or more multimedia servers may store multimedia (e.g., images, video, audio) in transit between messaging endpoints, multimedia cached for offline endpoints, and may perform transcoding of multimedia.

The messaging system 200 may comprise one or more payment servers 247. The one or more payment servers 247 may process payments from users. The one or more payment servers 247 may connect to external third-party servers for the performance of payments.

The messaging system 200 may comprise one or more registration servers 248. The one or more registration servers 248 may register new users of the messaging system 200.

The messaging system 200 may comprise one or more voice relay servers 249. The one or more voice relay servers 249 may relay voice-over-internet-protocol (VoIP) voice communication between messaging endpoints for the performance of VoIP calls.

Figure 3:
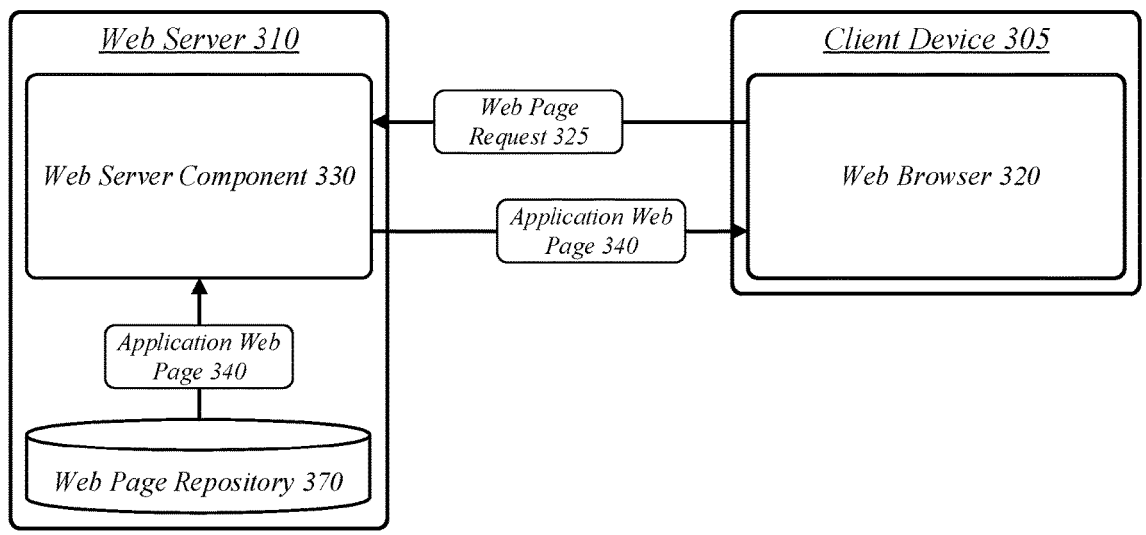
FIG. 3 illustrates an embodiment of a web application update system providing an application web page.

FIG. 3 illustrates an embodiment of a web application update system 100 providing an application web page, for example, the first time an application web page is accessed by the web browser 320 executing on the client device 305.

The client device 305 may be any computing device, for example, a smartphone device 150, a tablet device 160, a personal computer device 180, or any other computing device capable of executing a web browser application.

The web browser 320 may be any software application capable of requesting, receiving, and presenting data provided in a markup language format, such as hypertext markup language (HTML) or extensible markup language (XML), in a scripting language, as an applet, and so forth. As shown, a user may request to access an Internet address for a web application in the web browser 320, for example, by typing in a uniform resource locator (URL) or by selecting a hyperlink to the Internet address.

The web browser 320 may send a web page request 325 to a web server 310 that hosts the requested Internet address. The web page request 325 may be sent via a hypertext transport protocol (HTTP) request for an application web page 340 associated with a web interface to the functionality of the application. An HTTP request may be sent as a hypertext transport protocol secure (HTTPS) or other secure variation to the HTTP standard.

A web server 310 that hosts the requested Internet address may receive the web page request 325. The web server 310 may be any computing device or group of computing devices capable of receiving and responding to requests for web pages.

The web server 310 may include a web server component 330, which may be software and/or hardware instructions that receive a web page request 325 and respond to the request. For example, the web server component 330 may search a local or remote web page repository 370 for the requested web page and may send the requested application web page 340 back to the web browser 320. The web browser 320 may then present the application web page 340 to the user of the client device 305.

The application web page 340 may comprise one or more physical or logical files that include data and instructions to present the application in the web browser 320. The application web page 340 may include static text, dynamic text, hyperlinks, images, and so forth. The application web page 340 may include a script for a service worker web application as will be described below.

Figure 4:
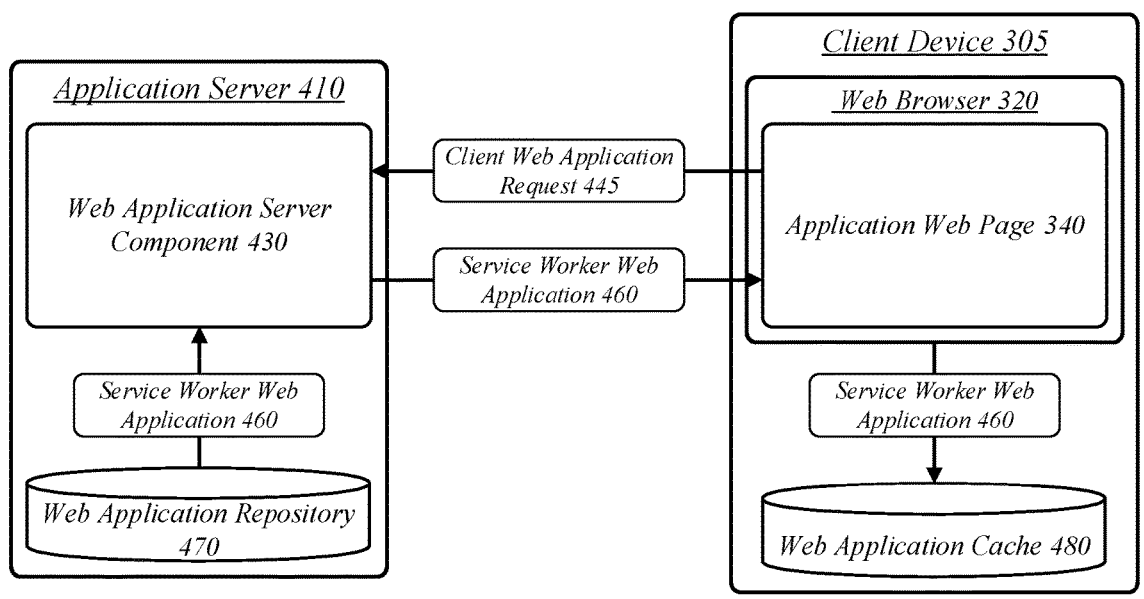
FIG. 4 illustrates an embodiment of a web application update system providing a service worker web application.

FIG. 4 illustrates an embodiment of the web application update system 100 providing a service worker web application. Once the application web page 340 has been received by the client device 305, the web browser 320 may present it. When the application web page 340 includes references or links to other resources, such as to a script, the web browser 320 may request a resource or execute the script.

As seen in FIG. 4, the application web page 340 includes a reference to an application, for example, a JavaScript® application that executes to provide a service worker web application. The web browser 320 therefore sends a client web application request 445 to the application server 410 to request the service worker web application referred to by the application web page 340.

The application server 410 may be the same as the web server 310 or may be a different device or group of devices. The application server 410 may include a web application server component 430 that provides some or all of the server-side operations of the application being accessed by the application web page 340. In particular, the application server component 430 may receive the client web application request 445 and may locate the service worker web application 460 identified by the request 445 in a web application repository 470. The web application repository 470 may be a storage device local to the application server 410 or remotely accessible to the application server 410.

The web application server component 430 may provide the service worker web application 460 to the application web page 340 in response to the request 445.

When received by the application web page 340, the service worker web application 460 may be stored locally in a web application cache 480 on the client device 305.

Figure 5:
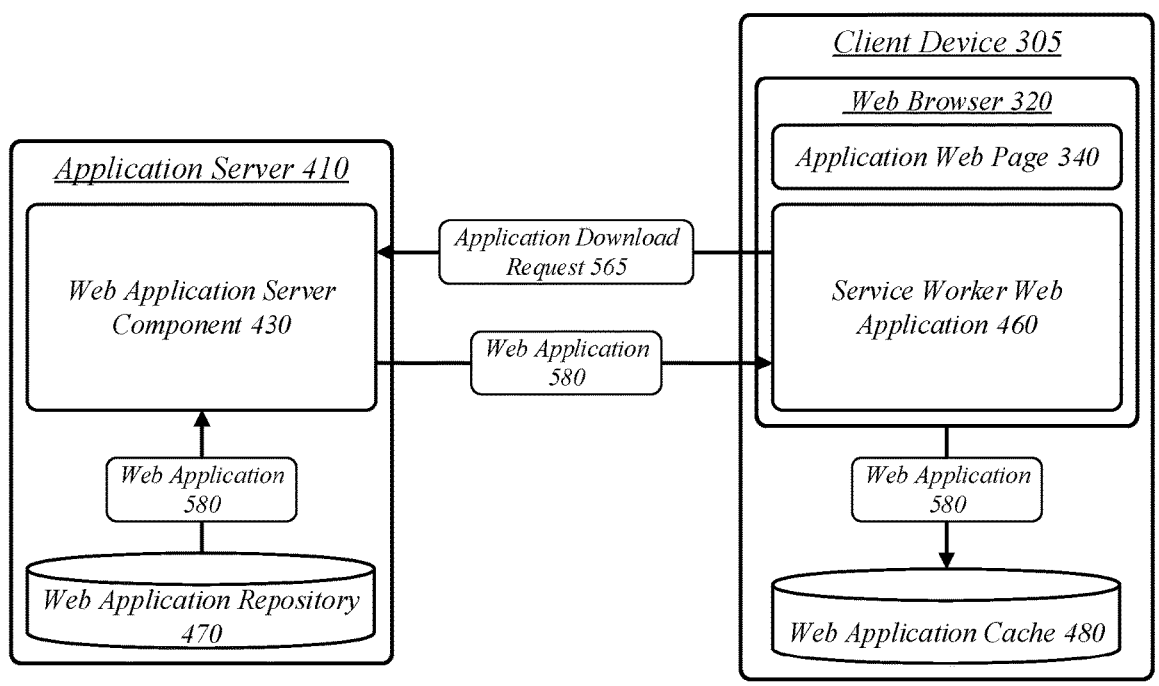
FIG. 5 illustrates an embodiment of a web application update system providing a web application.

FIG. 5 illustrates an embodiment of the web application update system 100 providing a web application. Once the service worker web application 460 is received and cached by the web browser 320, the service worker web application 460 may begin executing within the web browser 320.

The service worker web application 460 may be, in an embodiment, its own separate context, for example, a JavaScript® context. The service worker web application 460 may intercept network requests and perform its own computation and caching operations. The service worker web application 460 may include a reference or link to the web application that will perform the client-side operations of the application service provided by the application server 410. As such, when the service worker web application 460 begins execution, it may send an application download request 565 to the application server 410.

The web application server component 430 may receive the application download request 565 and may locate the requested web application 580 in a web application repository 470. The web application repository 470 may be a storage device local to the application server 410 or remotely accessible to the application server 410.

The web application server component 430 may provide the web application 580 to the application web page 340 in response to the request 565.

When received by the service worker web application 460, the web application 580 may be stored locally in the web application cache 480 on the client device 305.

The operations depicted in FIG. 3-5 may only need to take place once for a given web browser 320 on the client device 305 for a given web application 580. In some embodiments, the web application 580 may be accessible to other web browser applications on the client device 305 via the web application cache 480.

Figure 6:
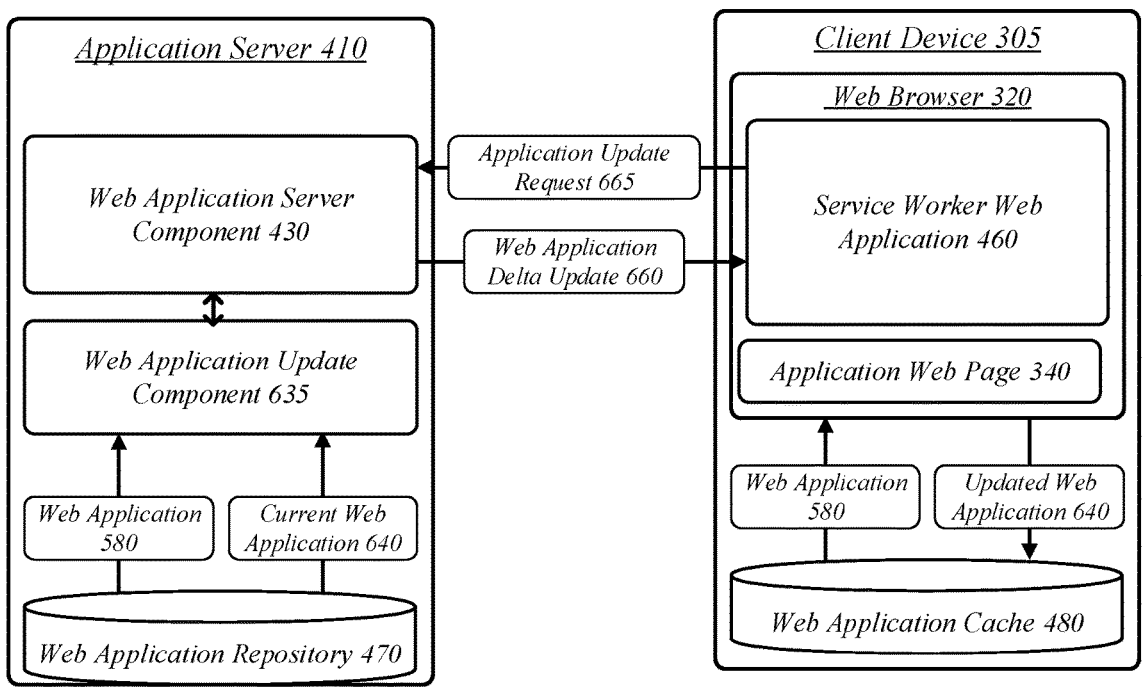
FIG. 6 illustrates an embodiment of a web application update system providing a web application delta update.

FIG. 6 illustrates an embodiment of the web application update system 100 providing a web application delta update. Once the web application 580 has been downloaded and stored on the client device 305, the service worker web application 460 may, after some period of time, periodically conduct updating operations to keep the web application 580 up-to-date.

The service worker web application 460 may periodically send an application update request 665 to the application server 410. For example, the application update request 665 may be sent after an elapsed period of time, e.g. once a day, once a week, whenever the web application is opened after being closed, and so forth. The application update request 665 may include a cached version indicator corresponding to a version of the web application 580 stored in the web application cache 480.

The web application server component 430 may receive the application update request 665 and provide the application update request 665 to a web application update component 635 when the current version of the web application is newer than the cached version.

The web application update component 635 may determine whether an updated requested web application is available based on the cached version indicator received from the service worker web application 460, for example, when the received cached version indicator is less than a current version indicator of the web application in the web application repository 470.

The web application update component 635 may retrieve an archived copy of the previous version of the requested web application 580, indicated by the received cached version indicator, and the current copy of the current version of the requested web application 640 from the web application repository 470 when the cached version indicator is less than the current version indicator.

The web application update component 635 may generate a web application delta update 640 based on the archived copy 580 and current copy 640. The web application delta update 640 may be a patch file that includes indications of the difference between the two copies, or instructions on how to modify the archived copy to match the current copy. The web application delta update 660 may be generated, for example, using a minimal block move diff technique. Other techniques for generating a delta update, for example, a line-by-line difference technique, may be used, although such techniques may generate larger delta updates than the minimal block move diff technique.

In an embodiment, the web application delta update 660 may be discarded from the application server 410 once it is sent to the service worker web application 460.

Generally the web application delta update 640 may be smaller in size than the whole files needed or used by the current web application 640. Accordingly, sending the web application delta update 640 may consume less bandwidth and fewer computing resources than conventional updating techniques.

The web application update component 635 may provide the web application delta update 660 to the web application server component 430, which may then send the web application delta update 660 to the service worker web application 460.

The service worker web application 460 may apply the web application delta update 660 to the web application 580 to generate the updated web application 640, which will then match the current web application on the application server 410. The updated web application 640 may then be cached in the web application cache 480, with an updated cached version indicator.

If the archived copy 580 and the current copy 640 have the same version number, then no web application delta update 660 is generated. The web application server component 430 may send an indication to the service worker web application 460 that the web application 580 is up to date.

Figure 7:
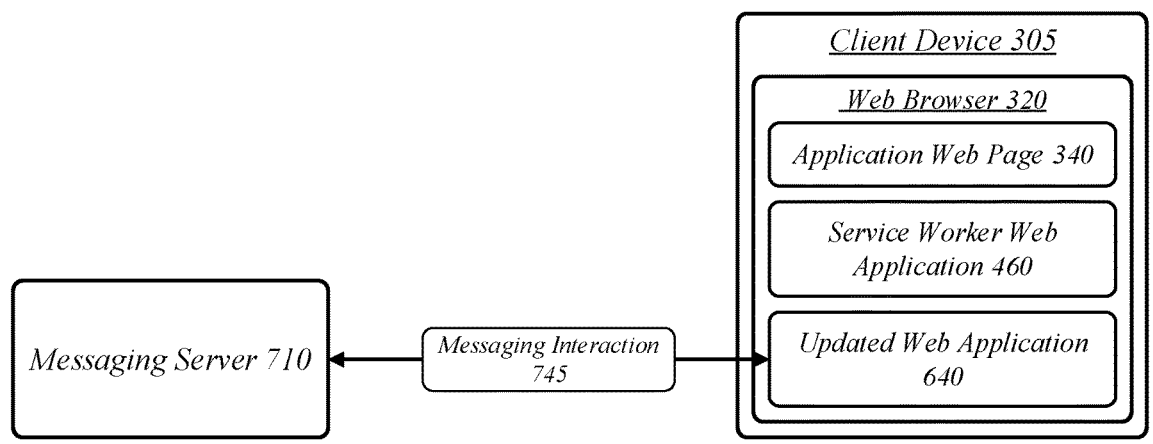
FIG. 7 illustrates an embodiment of a web application update system performing a messaging interaction using an updated web application.

FIG. 7 illustrates an embodiment of the web application update system 100 performing a messaging interaction using the updated web application 640. In the illustrated example, the web application 640 provides messaging functionality and communicates messaging interaction(s) 745 with a messaging server 710. The web application 640 may provide client-side functionality for any application server, not limited to messaging, for example, for navigation, games, media consumption and so forth.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 8 illustrates one embodiment of a logic flow 800. The logic flow 800 may be representative of some or all of the operations executed by one or more embodiments described herein.

In the illustrated embodiment shown in FIG. 8, the logic flow 800 may receive an application update request for a requested web application from a service worker web application at block 802. The service worker web application may be executing in a web browser on a client device. The application update request may comprise a cached version indicator for a cached copy of the requested web application local to the client device.

The logic flow 800 may determine whether an updated requested web application is available based on the cached version indicator received from the service worker web application at block 804.

The logic flow 800 may retrieve an archived copy of the previous version of the requested web application indicated by the cached version indicator, when the cached version indicator is less than a current version indicator, at block 806.

The logic flow 800 may retrieve a current copy of the current version of the requested web application, when the cached version indicator is less than a current version indicator, at block 808.

The logic flow 800 may generate a delta update based on the archived copy and current copy, when the cached version indicator is less than a current version indicator, at block 810.

The logic flow 800 may send the delta update to the service worker web application, when the cached version indicator is less than a current version indicator, at block 812.

The embodiments are not limited to this example.

Figure 9:
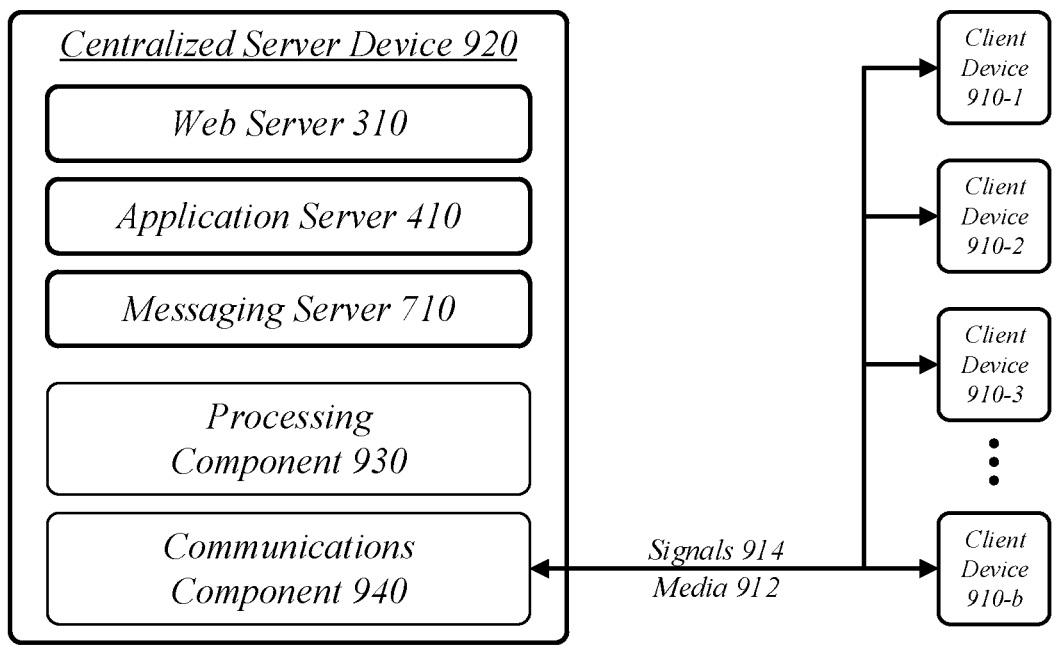
FIG. 9 illustrates an embodiment of a centralized system for the system of FIG. 1.

FIG. 9 illustrates a block diagram of a centralized system 900. The centralized system 900 may implement some or all of the structure and/or operations for the web application update system 100 in a single computing entity, such as entirely within a single centralized server device 920.

The centralized server device 920 may comprise any electronic device capable of receiving, processing, and sending information for the web application update system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 920 may execute processing operations or logic for the web application update system 100 using a processing component 930. The processing component 930 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 920 may execute communications operations or logic for the web application update system 100 using communications component 940. The communications component 940 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 940 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 912 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 920 may communicate with other devices over a communications media 912 using communications signals 914 via the communications component 940. The devices may be internal or external to the centralized server device 920 as desired for a given implementation. The devices may include a plurality of client devices 910. The client devices 910 may include, without limitation, the client device 305. The centralized server device 920 may execute all or some of the web server 310, application server 410, and messaging server 710.

Figure 10:
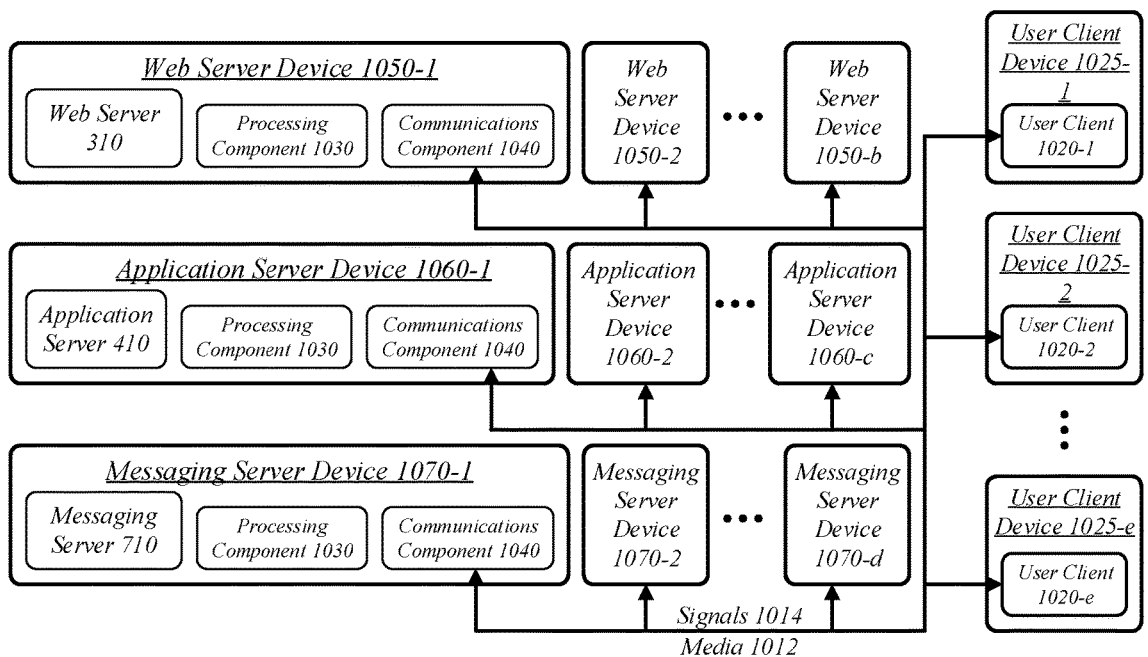
FIG. 10 illustrates an embodiment of a distributed system for the system of FIG. 1.

FIG. 10 illustrates a block diagram of a distributed system 1000. The distributed system 1000 may distribute portions of the structure and/or operations for the web application update system 100 across multiple computing entities. Examples of distributed system 1000 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 1000 may comprise a plurality of server devices 1050, 1060, 1070. In general, the server devices 1050, 1060, 1070 may be the same or similar to the centralized server device 920 as described with reference to FIG. 9. For instance, the server devices 1050, 1060, 1070 may each comprise a processing component 1030 and a communications component 1040 which are the same or similar to the processing component 930 and the communications component 940, respectively, as described with reference to FIG. 9. In another example, the server devices 1050, 1060, 1070 may communicate over a communications media 1012 using communications signals 1014 via the communications components 1040.

The distributed system 1000 may comprise a plurality of web server devices 1050. Each of the web server devices 1050 may execute a web server 310. The distributed system 1000 may comprise a plurality of application server devices 1060. Each of the application server devices 1060 may execute an application server 410. The distributed system 1000 may comprise a plurality of messaging server devices 1070. Each of the messaging server devices 1070 may execute a messaging server 710.

Figure 11:
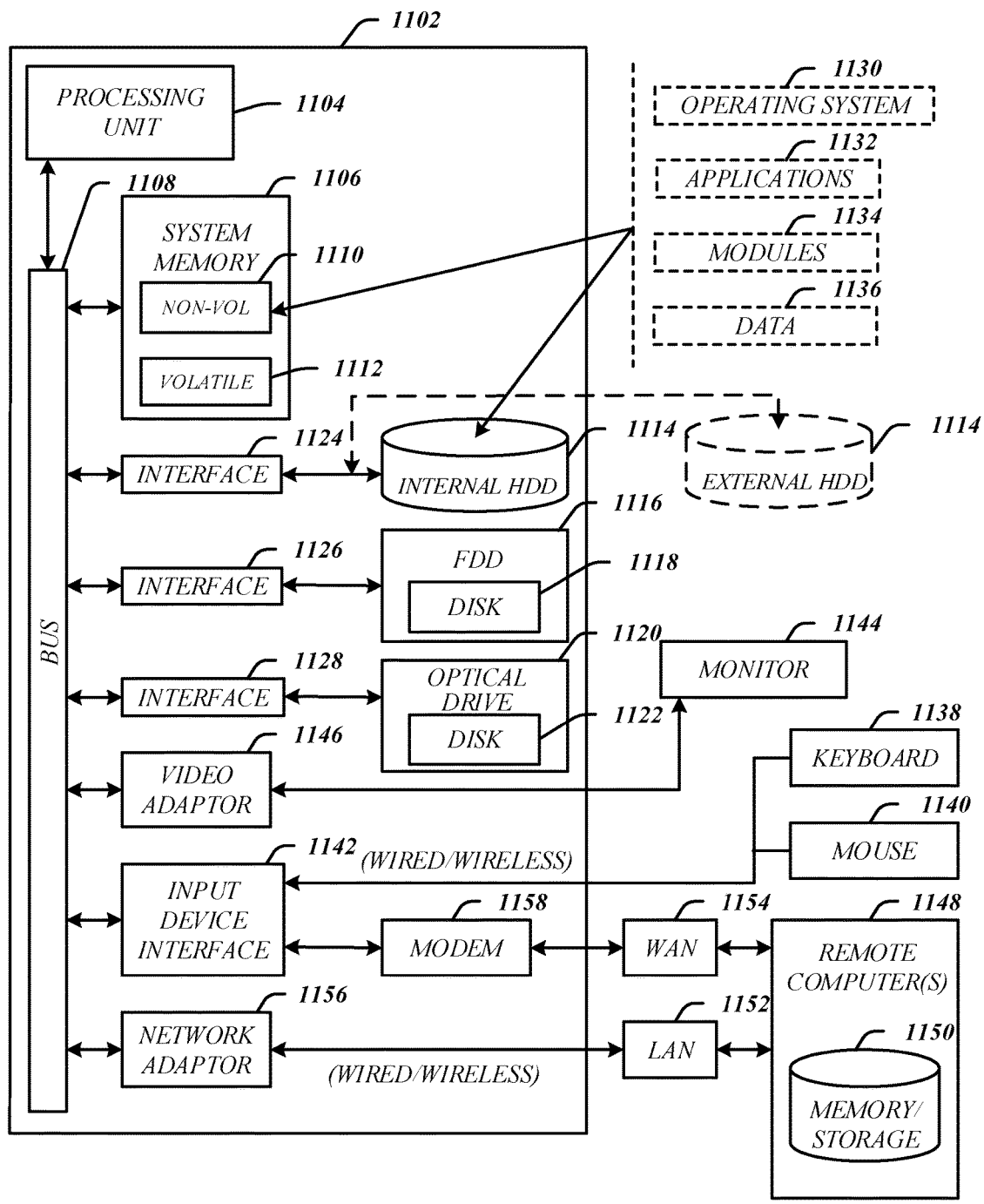
FIG. 11 illustrates an embodiment of a computing architecture.

FIG. 11 illustrates an embodiment of an exemplary computing architecture 1100 suitable for implementing various embodiments as previously described. In one embodiment, the computing architecture 1100 may comprise or be implemented as part of an electronic device. Examples of an electronic device may include those described with reference to FIG. 9, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1100 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1100.

As shown in FIG. 11, the computing architecture 1100 comprises a processing unit 1104, a system memory 1106 and a system bus 1108. The processing unit 1104 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1104.

The system bus 1108 provides an interface for system components including, but not limited to, the system memory 1106 to the processing unit 1104. The system bus 1108 can be any of several types of bus structure that may further interconnect to a memory bus (with or without a memory controller), a peripheral bus, and a local bus using any of a variety of commercially available bus architectures. Interface adapters may connect to the system bus 1108 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1100 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 11, the system memory 1106 can include non-volatile memory 1110 and/or volatile memory 1112. A basic input/output system (BIOS) can be stored in the non-volatile memory 1110.

The computer 1102 may include various types of computer-readable storage media in the form of one or more lower speed memory units, including an internal (or external) hard disk drive (HDD) 1114, a magnetic floppy disk drive (FDD) 1116 to read from or write to a removable magnetic disk 1118, and an optical disk drive 1120 to read from or write to a removable optical disk 1122 (e.g., a CD-ROM or DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1110, 1112, including an operating system 1130, one or more application programs 1132, other program modules 1134, and program data 1136. In one embodiment, the one or more application programs 1132, other program modules 1134, and program data 1136 can include, for example, the various applications and/or components of the web application update system 100.

A user can enter commands and information into the computer 1102 through one or more wire/wireless input devices, for example, a keyboard 1138 and a pointing device, such as a mouse 1140. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1104 through an input device interface 1142 that is coupled to the system bus 1108, but can be connected by other interfaces such as a parallel port, IEEE 1394 serial port, a game port, a USB port, an IR interface, and so forth.

A monitor 1144 or other type of display device is also connected to the system bus 1108 via an interface, such as a video adaptor 1146. The monitor 1144 may be internal or external to the computer 1102. In addition to the monitor 1144, a computer typically includes other peripheral output devices, such as speakers, printers, and so forth.

The computer 1102 may operate in a networked environment using logical connections via wire and/or wireless communications to one or more remote computers, such as a remote computer 1148. The remote computer 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, connects to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 12:
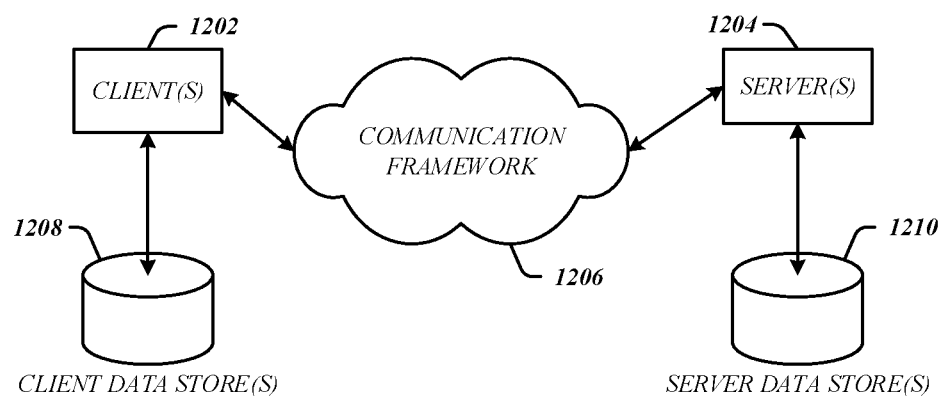
FIG. 12 illustrates an embodiment of a communications architecture.

FIG. 12 illustrates a block diagram of an exemplary communications architecture 1200 suitable for implementing various embodiments as previously described. The communications architecture 1200 includes various common communications elements, such as a transmitter, receiver, transceiver, radio, network interface, baseband processor, antenna, amplifiers, filters, power supplies, and so forth. The embodiments, however, are not limited to implementation by the communications architecture 1200.

As shown in FIG. 12, the communications architecture 1200 comprises includes one or more clients 1202 and servers 1204. The clients 1202 may correspond to the described client devices. The servers 1204 may correspond to the described servers. The clients 1202 and the servers 1204 are operatively connected to one or more respective client data stores 1208 and server data stores 1210 that can be employed to store information local to the respective clients 1202 and servers 1204, such as cookies and/or associated contextual information.

The clients 1202 and the servers 1204 may communicate information between each other using a communication framework 1206. The communications framework 1206 may implement any well-known communications techniques and protocols. The communications framework 1206 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1206 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1202 and the servers 1204. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 13:
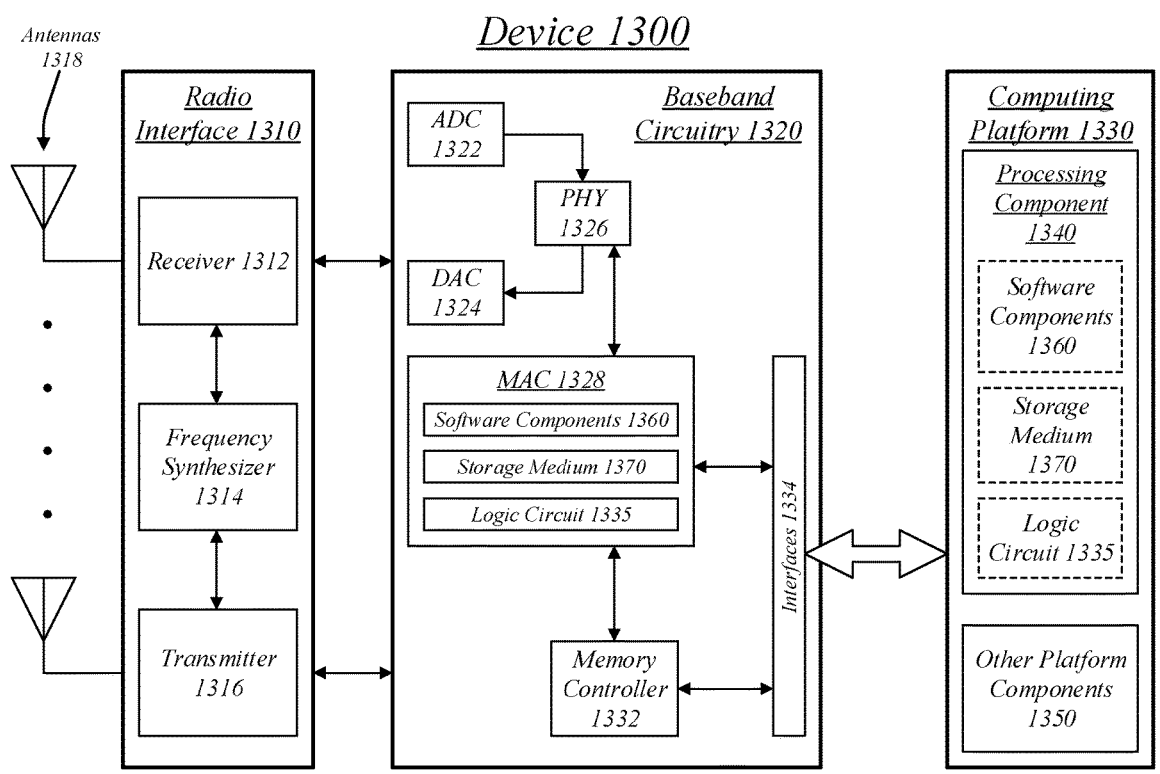
FIG. 13 illustrates an embodiment of a radio device architecture.

FIG. 13 illustrates an embodiment of a device 1300 for use in a multicarrier OFDM system, such as the web application update system 100. Device 1300 may implement, for example, software components 1360 as described with reference to web application update system 100 and/or a logic circuit 1335. The logic circuit 1335 may include physical circuits to perform operations described for the web application update system 100. As shown in FIG. 13, device 1300 may include a radio interface 1310, baseband circuitry 1320, and computing platform 1330, although embodiments are not limited to this configuration.

The device 1300 may implement some or all of the structure and/or operations for the web application update system 100 and/or logic circuit 1335 in a single computing entity, such as entirely within a single device. Alternatively, the device 1300 may distribute portions of the structure and/or operations for the web application update system 100 and/or logic circuit 1335 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1310 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1310 may include, for example, a receiver 1312, a transmitter 1316 and/or a frequency synthesizer 1314. Radio interface 1310 may include bias controls, a crystal oscillator and/or one or more antennas 1318. In another embodiment, radio interface 1310 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1320 may communicate with radio interface 1310 to process receive and/or transmit signals and may include, for example, an analog-to-digital converter 1322 for down converting received signals, a digital-to-analog converter 1324 for up converting signals for transmission. Further, baseband circuitry 1320 may include a baseband or physical layer (PHY) processing circuit 1356 for PHY link layer processing of respective receive/transmit signals. Baseband circuitry 1320 may include, for example, a processing circuit 1328 for medium access control (MAC)/data link layer processing. Baseband circuitry 1320 may include a memory controller 1332 for communicating with processing circuit 1328 and/or a computing platform 1330, for example, via one or more interfaces 1334.

In some embodiments, PHY processing circuit 1326 may include a frame construction and/or detection module, in combination with additional circuitry such as a buffer memory, to construct and/or deconstruct communication frames, such as radio frames. Alternatively or in addition, MAC processing circuit 1328 may share processing for certain of these functions or perform these processes independent of PHY processing circuit 1326. In some embodiments, MAC and PHY processing may be integrated into a single circuit.

The computing platform 1330 may provide computing functionality for the device 1300. As shown, the computing platform 1330 may include a processing component 1340. In addition to, or alternatively of, the baseband circuitry 1320, the device 1300 may execute processing operations or logic for the web application update system 100 and logic circuit 1335 using the processing component 1340. The processing component 1340 (and/or PHY 1326 and/or MAC 1328) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1330 may further include other platform components 1350. Other platform components 1350 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1300 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1300 described herein, may be included or omitted in various embodiments of device 1300, as suitably desired. In some embodiments, device 1300 may be configured to be compatible with protocols and frequencies associated one or more of the 3GPP LTE Specifications and/or IEEE 1302.16 Standards for WMANs, and/or other broadband wireless networks, cited herein, although the embodiments are not limited in this respect.

Embodiments of device 1300 may be implemented using single input single output (SISO) architectures. However, certain implementations may include multiple antennas (e.g., antennas 1318) for transmission and/or reception using adaptive antenna techniques for beamforming or spatial division multiple access (SDMA) and/or using MIMO communication techniques.

The components and features of device 1300 may be implemented using any combination of discrete circuitry, application specific integrated circuits (ASICs), logic gates and/or single chip architectures. Further, the features of device 1300 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1300 shown in the block diagram of FIG. 13 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise receiving an application update request for a requested web application from a service worker web application, the service worker web application executing in a web browser on a client device, the application update request comprising a cached version indicator for a local cached copy of the requested web application on the client device; determining whether an updated requested web application is available based on the cached version indicator received from the service worker web application; retrieving an archived copy of the previous version of the requested web application indicated by the cached version indicator where the cached version indicator is less than a current version indicator; retrieving a current copy of the current version of the requested web application where the cached version indicator is less than a current version indicator; generating a delta update based on the archived copy and current copy where the cached version indicator is less than a current version indicator; and sending the delta update to the service worker web application where the cached version indicator is less than a current version indicator.

The application update request may be received in response to an application load request of the web application in the web browser on the client device. The service worker web application may comprise a first client-side web application, and the requested web application may comprise a second client-side web application.

The method may further comprise receiving a client web application request from the web browser on the client device; sending the service worker web application in response to the client web application request; receiving an application download request from the service worker web application; and sending the previous version of the requested web application to the service worker web application in response to the application download request, wherein the previous version of the requested web application was current at a time of request for the application download request.

The method may further comprise receiving a web page request for the client web application from the web browser on the client device, the web page request comprising the client web application request; and sending a client web application web page to web browser on the client device in response to the web page request, the client web application comprising the service worker web application.

The method may further comprise generating the delta update generated using a minimal block move diff technique. The delta update may be discarded following sending the delta update to the service worker web application.

An apparatus may comprise a web application server component operative to receive an application update request for a requested web application from a service worker web application, the service worker web application executing in a web browser on a client device, the application update request comprising a cached version indicator for a cached copy of the requested web application local to the client device; and send a delta update to the service worker web application where the cached version indicator is less than a current version indicator of the requested web application on the web application server.

The apparatus may further comprise a web application update component operative to determine whether an updated requested web application is available based on the cached version indicator received from the service worker web application; retrieve an archived copy of the previous version of the requested web application indicated by the cached version indicator where the cached version indicator is less than a current version indicator; retrieve a current copy of the current version of the requested web application where the cached version indicator is less than a current version indicator; and generate the delta update based on the archived copy and current copy where the cached version indicator is less than a current version indicator. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
   receiving an application update request for a requested web application on a client device from a service worker web application, the service worker web application executing in a web browser on the same client device as the requested web application, the service worker web application separate from the requested web application and operative to load and maintain the requested web application, the application update request comprising a cached version indicator for a local cached copy of the requested web application on the client device;
   determining that the cached version indicator received with the application update request is less than a current version indicator for the requested web application;
   retrieving a copy of a previous version of the requested web application indicated by the cached version indicator;
   retrieving a copy of a current version of the requested web application;
   generating a delta update based on the previous version and the current version of the requested web application; and
   sending the delta update to the service worker web application where.

2. The method of claim 1, the application update request received in response to an application load request of the web application in the web browser on the client device.

3. The method of claim 1, further comprising:
   receiving a client web application request from the web browser on the client device;
   sending the service worker web application in response to the client web application request;
   receiving an application download request from the service worker web application; and
   sending the previous version of the requested web application to the service worker web application in response to the application download request, wherein the previous version of the requested web application was current at a time of request for the application download request.

4. The method of claim 3, further comprising:
   receiving a web page request for the client web application from the web browser on the client device, the web page request comprising the client web application request; and
   sending a client web application web page to web browser on the client device in response to the web page request, the client web application comprising the service worker web application.

5. The method of claim 1, further comprising:
   generating the delta update using a minimal block move diff technique.

6. The method of claim 1, further comprising:
   discarding the delta update following sending the delta update to the service worker web application.

7. An apparatus, comprising:
   a processor;

a web application server component operative on the processor to:

receive an application update request for a requested web application on a client device from a service worker web application, the service worker web application executing in a web browser on the same client device as the requested web application, the service worker web application separate from the requested web application and operative to load and maintain the requested web application, the application update request comprising a cached version indicator for a cached copy of the requested web application local to the client device; and send a delta update to the service worker web application where the cached version indicator is less than a current version indicator of the requested web application on the web application server; and a web application update component operative to:

determine that the cached version indicator received with the application update request is less than a current version indicator for the request web application;

retrieve a copy of a previous version of the requested web application indicated by the cached version indicator;

retrieve a copy of a current version of the requested web application where the cached version indicator is less than a current version indicator; and generate the delta update based on the previous version and the current version of the requested web application.

8. The apparatus of claim 7, the application update request received in response to an application load request of the web application in the web browser on the client device.

9. The apparatus of claim 7, further comprising:

the web application server component operative to:

receive a client web application request from the web browser on the client device;

send the service worker web application in response to the client web application request;

receive an application download request from the service worker web application; and send the previous version of the requested web application to the service worker web application in response to the application download request, wherein the previous version of the requested web application was current at a time of request for the application download request.

10. The apparatus of claim 9, further comprising:

the web application server component operative to:

receive a web page request for the client web application from the web browser on the client device, the web page request comprising to the client web application request; and send a client web application web page to web browser on the client device in response to the web page request, the client web application comprising the service worker web application.

11. The apparatus of claim 7, the delta update generated using a minimal block move diff technique.

12. The apparatus of claim 7, further comprising:

the web application update component operative to:

discard the delta update following the web application server component sending the delta update to the service worker web application.

13. At least non-transitory one computer-readable storage medium comprising instructions that, when executed, cause a system to:

receive an application update request for a requested web application on a client device from a service worker web application, the service worker web application executing in a web browser on the same client device as the requested web application, the service worker web application separate from the requested web application and operative to load and maintain the requested web application, the application update request comprising a cached version indicator for a cached copy of the requested web application local to the client device;

determine that the cached version indicator received with the application update request is less than a current version indicator for the requested web application;

retrieve a copy of a previous version of the requested web application indicated by the cached version indicator;

retrieve a copy of a current version of the requested web application;

generate a delta update based on the previous version and the current version of the requested web application; and send the delta update to the service worker web application.

14. The computer-readable storage medium of claim 13, the application update request received in response to an application load request of the web application in the web browser on the client device.

15. The computer-readable storage medium of claim 13, comprising further instructions that, when executed, cause a system to:

receive a client web application request from the web browser on the client device;

send the service worker web application in response to the client web application request;

receive an application download request from the service worker web application; and send the previous version of the requested web application to the service worker web application in response to the application download request, wherein the previous version of the requested web application was current at a time of request for the application download request.

16. The computer-readable storage medium of claim 15, comprising further instructions that, when executed, cause a system to:

receive a web page request for the client web application from the web browser on the client device, the web page request comprising to the client web application request; and send a client web application web page to web browser on the client device in response to the web page request, the client web application comprising the service worker web application.

17. The computer-readable storage medium of claim 13, comprising further instructions that, when executed, cause a system to:

discard the delta update following sending the delta update to the service worker web application.

* * * * *